United States Patent [19]

Babcock et al.

[11] Patent Number: 4,913,862

[45] Date of Patent: Apr. 3, 1990

[54] METHODS FOR APPLYING NO MIX PLASTIC COMPOUNDS

[75] Inventors: H. Nash Babcock, Old Greenwich; Edward P. Holub, Bethel, both of Conn.

[73] Assignee: Nomix Corporation, Fairfield, Conn.

[21] Appl. No.: 82,180

[22] Filed: Aug. 6, 1987

Related U.S. Application Data

[63] Continuation-in-part of Ser. No. 53,561, May 21, 1987, Pat. No. 4,732,782, which is a continuation-in-part of Ser. No. 843,316, Mar. 24, 1986, abandoned.

[51] Int. Cl.⁴ .................. B28B 1/14; B29C 39/02; B29C 41/02; B29C 41/42
[52] U.S. Cl. ...................................... 264/36; 264/240; 264/259; 264/267; 264/299; 264/334; 427/140; 427/142; 427/180; 427/204; 427/386
[58] Field of Search ................. 264/36, 240, 299, 267, 264/334, 259; 427/140, 386, 180, 204, 142; 156/94; 138/97; 144/332, 330; 428/63; 52/514, DIG. 7; 29/402.18

[56] References Cited

U.S. PATENT DOCUMENTS

| | | | |
|---|---|---|---|
| 3,665,720 | 5/1972 | Havino. | |
| 3,682,676 | 8/1972 | Karrh et al. | 427/204 |
| 3,725,105 | 4/1973 | Chase | 427/140 |
| 4,243,696 | 1/1981 | Toth | 427/204 |
| 4,301,763 | 11/1981 | Goldstone et al. | 427/180 |

Primary Examiner—Jan H. Silbaugh
Assistant Examiner—Karen D. Kutach
Attorney, Agent, or Firm—Pennie & Edmonds

[57] ABSTRACT

Methods of forming a filled, cured two-component organic thermosetting composition by placing resin and hardener components on a substrate or in a container or mold and dropping particles of a filler material therethrough so that the resin and hardener components contact each other, react and cure, thus forming the cured composition.

21 Claims, No Drawings

METHODS FOR APPLYING NO MIX PLASTIC COMPOUNDS

This is a continuation-in-part of application Ser. No. 053,561, filed May 21, 1987, now U.S. Pat. No. 4,732,782, which is a continuation-in-part of application Ser. No. 843,316, filed Mar. 24, 1986, now abandoned.

TECHNICAL FIELD

The present invention relates to methods and compositions for the application or placement of cementitious compositions which do not require premixing with water.

BACKGROUND OF THE INVENTION

At present, it is essential that all cementitious compositions are mixed with water before placement in order to obtain the proper characteristics of the final product. Some type of mixing is and has always been required. Some manufacturers of premixes have put the dry premix in a hole and then recommended adding the water. Some have put premixes in bags and dropped the mixes while in bags through the water, then after the bags are in place, letting water penetrate through the bag to the mix. However, these systems have not allowed full hydration. Mortar mixers, concrete mixers, hand mixing or other types of wet mixing have been utilized to obtain a uniform distribution of the appropriate amount of water in the cement. According to the prior art, the quantity of water to be mixed with the cement must be controlled to a very narrow range, and too little or too much water will produce an ineffective or unusable material. Cementitious mixtures could not be placed in a dry state directly into water or on to a wet surface without first wetting and mixing the dry components.

SUMMARY OF THE INVENTION

The present invention relates to dry cementitious compositions which have finely divided particles of at least one cement binder. The cement may be Portland cement, gypsum, high aluminum cement, or mixtures thereof, but not restricted thereto. Magnesium phosphate or other fastsetting compounds may also be used. The major portion of particles have approximately the same drop rate in water, so that when poured through water according to the invention, the material does not appreciably segregate.

These compositions may further include a filler component of sand or aggregate particles, provided that the major portion of those particles have a drop rate in water which is approximately the same as the cement particles. Also, the cementitious mixture should be able to absorb and/or combine with water in the amount approximately 50% by volume. The higher the amount of water the cementitious mixture can tolerate, the better the finished product.

It is possible to use other additives in these compositions. Such additives may include, but are not limited to, accelerators, water reducing compounds, pumping aids, water absorbing compounds, waterproofing agents, polymers, drying shrinkage inhibitors, wet shrinkage inhibitors, lime, pigments and the like, and may be added to improve or impart a particular property to the composition.

The invention also relates to a method for making these compositions. These methods include providing the cement binder in the form of finely divided particles and adjusting the drop rate of the major portion of particles to approximately the same range. Filler components, if added, are treated the same. When fillers are added, it is preferable to mix the dry ingredients to a homogenous consistency.

The invention also contemplates various methods for installing cement products upon a substrate which comprises saturating the substrate with an amount of water which is substantially in excess of the normal amount of dry components which are subsequently added. The dry power is added without any physical mixing other than that caused by the falling of the dry powder through the water, in a manner such that it combines with a portion of the water and displaces the remainder of the water. The applied combination is then allowed to cure to a final product.

Specific methods are presented hereinbelow.

DETAILED DESCRIPTION OF THE PREFERRED EMBODIMENTS

The invention relates to dry cementitious compositions which are poured, troweled or sprayed through excess water or onto wet surfaces without mixing to hydrate the cement component and obtain high strength products after setting and curing. Cementitious compositions of Portland cements, gypsums, high alumina cements, other specialty cements and combinations, as well as other chemicals such as magnesium phosphates, all have been successfully used, the only limitation being that at least one component of the cementitious composition is hydrated by or reacts with water.

When the formulations of these cementitious compositions are properly controlled, the problems of thorough wetting of the cement without overwetting, of segregation of components, and of loss of compressive strength of the cured product are greatly reduced or eliminated.

Where cement coatings are desired, the surface area to be coated is first prewetted and saturated with water. The dry cementitious mixture is placed on the surface, instantly reacting with the wet surface. If additional layers or a greater thickness of the coating is needed, the first cement layer can be prewetted and the dry composition sprayed directly thereupon to increase the thickness and structural strength of the overall coating.

On horizontal surfaces, the area to be poured with cement is first flooded with water, then the dry cementitious compositions of the invention can be poured into the water. The excess water is displaced by the cementitious composition, and the composition is then allowed to cure. This provides a fast, simple installation of cement without the need for tools, mixing apparatus, water measurement aids or the like. For floor levelings, for example, the floor can be flooded to form puddles in low areas. The dry cementitious composition is then sprinkled in the areas where puddles are formed, and allowed to cure. Thus, the floor is easily levelled by this procedure.

Controlling the rate of hydration may lead to many applications. For instance, for coating vertical surfaces, a very fast setting material can be used to eliminate the problems of running, sagging or failure to bond. Where mortar for bricklaying is desired, a material with a longer set time will allow the operator sufficient time to work with the material. For situations where the surface particles have not been properly wetted, additional water may be applied to the surface for more activation and further finishing.

In the past, there has always been difficulty in controlling the amount of water for the patching of highways or other horizontal surfaces. This problem is solved by this invention because the amount of water is controlled by the formulation of the dry cementitious composition itself. For example, water can be placed into a footing, post hole, mortar joint or tub, or pothole and then the dry cementitious material may be placed by pouring, spraying, or screening into the cavity until the desired level is reached. Excess water, if present, is displaced from the hole by the dry material. The rate of setting of the cementitious mixture can be designed to meet the needs of the particular application. The amount of water required depends on the specific composition and application used.

For the placement of concrete foundations, a hole is first prepared, then filled with the required amount of water. If desired, forms can be used to help contain the water. The dry material can be then poured directly into the foundation area to the desired height, thus displacing the excess water, if any. After the material cures, the foundation is complete.

In certain circumstances, a cavity could have a small percentage of water placed into it and then the first part of the cementitious mixture placed into the water. While this placement is taking place, additional water could then be placed into the hole by various methods simultaneously with the placement of the rest of the cementitious mixture. When the final quantity of the cementitious mixture is reached, the entire surface area could be sprayed for troweling or other finishing purposes as could be done when the entire mixture is poured through water.

In the situation where the cavity is porous and cannot hold water, it is possible to thoroughly wet the surfaces of the hole and then introduce a fast setting cementitious mixture. It is then possible to fill the lined hole with water and proceed as above.

The control of density and size of the dry components and the rate of drop through water is essential for the proper performance of the cementitious mixtures. The ability to use materials of various sizes and densities, whose drop rate would otherwise be higher if a slow setting cementitious mixture was used, is enhanced by the increased rate of the water activation of the cementitious particles to form a homogeneous mixture.

The use of specific cementitious compositions may be varied or adjusted to meet the needs of the particular application. The most ideal situation is to balance the drop rate for all the dry ingredients and to control the setting time of the cement so that all particles will be properly hydrated and integrated with the aggregates, if any. In this manner, masonry walls can be built up with dry mortars which are hydrated after installation. Precast and prestressed sections are put in place, the dry mixture is placed in water in the joints and the surface can be wetted down for complete activation of the cement binder. The setting time of the binders can be accelerated to a few seconds or slowed up for days, depending upon the selection of cement component.

The system can be used with any normal additives acceptable to the specific composition. In some compositions, no curing agent is required. Furthermore, the compositions may contain numerous chemicals or additives that are compatible to the system for the purpose of improving or imparting certain properties. Additives such as accelerators, water reducers, bonding agents, curing agents, or pumping or waterproofing aids may be added to the compositions of the invention. These additives or modifying agents can be added to the water or to the cement mix, in any order or combination.

The examples show the success of adding cementitious compositions to water after the water is in place.

When dry, preblended materials are used, there is a much greater potential for higher quality finished product.

If aggregates are found to be too heavy, smaller aggregates or lighter weight aggregates can be used to keep the density of the overall system in balance.

The present invention provides the following:
1. Dry cement can be used.
2. Cement and sand can be used.
3. Cement, sand and aggregates can be used.
4. All types of cements can be used.
5. All types of cementitious particles, such as gypsums, limes and so forth can be used.
6. All types of chemical cements, even with water soluble parts, can be used.
7. No wet mixing or blending equipment is required since no physical mixing takes place other than that caused by the particles falling through the water.
8. No addition of water to mixes is required before placement, avoiding all equipment costs and clean up.
9. When placements under deep water conditions where tremés, elephant trunks or pipes would be required, the material under this formula can be placed dry in the tube and activated by available water at the end of the line, thus keeping all conveyances clear of wet cement.
10. When cement contents are too low in mixtures to prevent proper strength development or prevent overadsorption of water, resulting in weak or segregated mixes, more cement may be added, or water absorption material may be added, to prevent excess water from decreasing the quality of the mix.

Present cement mixes with less than 20 percent by weight of a cementitious binder should have some additional water absorption agent in the mix to prevent overwatering and segregation. Ideally, cementitious compositions of the mixtures should have the maximum amount of water absorbency possible. The higher the ratio of chemical bonded water to the binder, the better and more versatile a product will be achieved.

Cementitious mixtures containing more than 20 percent by weight cement may or may not need additional cement or water absorbers, depending on the application. Generally, at least 35 percent by weight of a cement binder is preferred for use in the compositions and methods of this invention.

While using liquids other than water, such as two component thermosetting organic compounds, an aggregate or sand or mixtures thereof can be dropped through the liquid or chemicals, causing the final mixture to be blended by gravity or by the solid ingredients passing through the liquid, without any other physical mixing thereof, which will result in a cured hardened mass of aggregate or sand and chemical.

EXAMPLES

The scope of the invention is further described in connection with the following examples which are set for the sole purpose of illustrating the preferred embodiments of the invention and which are not to be construed as limiting the scope of the invention.

The first 9 of the following examples are cementitious materials that were poured into a 4"×8" cylinder which was filled with water. The material was poured until it reached a level of about ½" below the top of the cylinder. The cementitious material was then allowed to cure.

EXAMPLE 1.

| Substance (common sand/cement mix) | Percentage |
|---|---|
| Portland Cement Type I | 20% |
| Sand | 80% |
| Set time is 20 hours. | |
| Compressive strength at 24 hours is 0.0 psi (too little cement) | |

EXAMPLE 2.

| Substance | Percentage |
|---|---|
| Portland Cement Type I | 90% |
| Sand | 10% |
| Set time 12 hours. | |
| Compressive strength at 24 hours is 1,100 psi. | |

EXAMPLE 3.

| Substance | Percentage |
|---|---|
| Portland Cement Type I | 50% |
| Sand | 50% |
| Set time 16 hours. | |
| Compressive strength at 24 hours is 600 psi. | |

EXAMPLE 4. (COMPARATIVE EXAMPLE)

| Substance | Percentage |
|---|---|
| Portland Cement Type I | 50% |
| Pea Gravel | 50% |
| Set time 16 hours. | |
| Compressive strength at 24 hours is 0.0 psi. (different drop rates). | |

EXAMPLE 5.

| Substance | Percentage |
|---|---|
| Portland Cement Type II | 50% |
| Plaster of Paris | 50% |
| Set time 10 minutes. | |
| Compressive strength at 24 hours is 1,600 psi. | |

EXAMPLE 6.

| Substance | Percentage |
|---|---|
| High Alumina Cement | 80% |
| Sand | 20% |
| Set time 12 hours. | |
| Compressive strength at 24 hours is 1,100 psi. | |

EXAMPLE 7.

| Substance | Percentage |
|---|---|
| High Alumina Cement | 20% |
| Sand | 80% |
| Set time 20 hours. | |
| Compressive strength at 24 hours is 0.0 psi. (too little cement). | |

EXAMPLE 8.

| Substance | Percentage |
|---|---|
| High Alumina Cement | 25% |
| Portland Cement Type III | 25% |
| Lithium Carbonate | 1% |
| Sand | 49% |
| Set time is 5 minutes. | |
| Compressive strength at 24 hours is 1,100 psi. | |

EXAMPLE 9.

| Substance | Percentage |
|---|---|
| Magnesium Oxide | 30% |
| Ammonium Phosphate | 10% |
| Sand | 60% |
| Set time is 5 minutes. | |
| Compressive strength at 24 hours is 1,100 psi. | |

EXAMPLE 10.

A test was run wherein the resin and hardener were of approximate equal density in an epoxy formulation. The resin and hardener were poured into a container without physical premixing, then the aggregate was dropped through the resin and hardener, without any physical mixing thereof other than by the falling of the aggregate through the resin and hardener as by gravity, forming a homogeneous mixture which cured and set into a hardened mass. The formula is given below.

| Substance | Percentage |
|---|---|
| Resin: | |
| Dow DER 331 | 13.1% |
| Epoxy Resin | |
| Furfural Alcohol | 3.3% |
| Hardener: | |
| Dow DEH 58 | 3.5% |
| Diethylene Triamine modified with Bisphenol A | |
| E6TPP Borg Warner Triphenyl Phosphate | 3.5% |
| Sand | 76.6% |
| Set time is 30 minutes. | |
| Compressive strength at 24 hours is 1,500 psi. | |

This test illustrates that two component thermosetting organic materials can be applied without mixing. Such materials include polyesters, epoxies, polyurethanes and others. According to the invention, the resin and hardener are formulated into portions of substantially similar or identical densities, then poured into place without premixing. Then, the introduction of an additive or filler, such as sand or aggregate, into the poured materials, also without physical mixing, blends these components to a homogeneous mixture which is capable of reacting or curing to a hardened mass.

These plastic compounds can also be applied to substrates in the same manner as described previously with respect to the cementitious compositions or by means of placement within a holding means. The holding means may be a temporary molding means from which the mixture is either removed from in a predetermined shape or removed and then coated onto a substrate. The holding means may also be a permanent molding means from which the final product is removed or with which the final product remains, such as a structural member of wood, cement, concrete, asphalt or metal which comprises an aperture or void which is filled by the plastic compounds.

The viscosity of the resin and hardener components are not critical to the invention, except that when high viscosity resin components are used, a major proportion of the particles which are dropped therethrough should have a higher density than that of the resin and hardener components so as to assure proper mixing, and curing of the composition. Generally, however, resin components having a viscosity below about 14,000 cps are the most advantageous for use in the methods of this invention, since lower density, ordinary filler particles such as sand and aggregate, can be used to blend the components to a homogeneous mixture. Thus, specialty, high density particles of lead, ceramics and the like are avoided by the use of such relatively low viscosity resins.

EXAMPLE 11

A well-known, commercially available epoxy grout (FIVE STAR EPOXY GROUT) was used in this experiment.

The resin and hardener were poured into a 4"×8" cylinder at the same time. The aggregate was then poured into the mold. The amount of epoxy grout necessary to fill the mold would have amounted to:
  595.2 g Resin
  131.1 g Hardener
  4,258.5 g Aggregate.

Using the no mixing procedure of the invention, only 2,725 g of aggregate is required. A greater amount of aggregate would not be expected to be wet by the amount of resin and hardener used.

The aggregate seemed to fall in lumps and was not easily wet out. This mass was stripped from the mold the next day. The material at the bottom ¾" of the mold was still not set. Pockets of dry aggregate were found. This shows that commercially available, prepackaged aggregates for epoxy grouts will not provide a suitable no mix system.

EXAMPLE 12

The same addition procedure was used as in Example 11, but this time a different aggregate was used. Whitehead Brothers #0 Sand was substituted for the FIVE STAR EPOXY aggregate. Substantially all the particles of the sand had substantially the same drop rate, as well as a greater density than that of the epoxy system.

595.2 g of FIVE STAR EPOXY GROUT resin and 131.1 of FIVE STAR EPOXY GROUT Hardener were poured into the 4"×8" mold at the same time. The #0 sand was then poured into the resin/hardener mixture. A total of 2,380 g of sand were used.

The mixture was stripped from the mold the next day. The mixture had reacted and set to a hardened mass. The 24 hour compressive strength was 5,970 psi. This shows that by adjusting the drop rate of the aggregate, a commercially available resin and hardener can be used to make a no mixing epoxy system.

EXAMPLE 13

It is known that FIVE STAR uses a modified diglycidyl ether of Bisphenol A for their resin. It has a viscosity of 600 centipoise. This resin was replaced with Reichhold 37-140, a diglycidyl ether of Bisphenol A, with a viscosity of 14,000 centipoise. The resin is modified with a $C_{10}$–$C_{12}$ aliphatic glycidyl ether. This experiment was done to show the importance of the viscosity of the resin in the epoxy no mix system.

595.2 g of Reichhold 37-140 resin and 131.1 g of FIVE STAR EPOXY GROUT Hardener were poured into the 4"×8" mold at the same time.

The #0 sand was then poured into the mixture. A total of 1,360 g of sand was added. The mold was stripped the next day. The sample had a soft spot on the top in the center. In the middle of the cylinder was an area of uncured or unextended epoxy. This cylinder had a 24 hour compressive strength of 640 psi. This shows the importance of the resin viscosity in obtaining a homogeneous epoxy mixture. By substituting a filler of higher density, such as steel or lead shot, the soft spots and unextended sections of epoxy can be avoided.

EXAMPLE 14

This experiment was done to show that no mix polymer technology applies not only to epoxy but also to many polymeric systems. Furfural alcohol resins have been used to make polymer concrete.

600 g of FA-Rok 913 furfural alcohol resin (from QC Chemicals) and 60 g of FA-Rok 6301 catalyst were poured into the 4"×8" cylinder mold at the same time. Whitehead Brothers #00 Sand was then poured into the mixture. A total of 2,270 g of #00 sand was added. This small amount of sand was used due to the much lower viscosity of the furfural alcohol resin (40 centipoise).

The smaller size aggregate (i.e., sand) provides better packing so that a greater amount of aggregate can be used. Furfural alcohol also provides a much higher exotherm as compared to epoxy systems, and the smaller aggregate is a better heat sink for this system.

This mix took one hour to react and set. This mixture was stripped from the mold the next day. The one day compressive strength was 1,230 psi.

While is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A method for preparing a cured, filled, two component organic thermosetting composition which comprises:
   placing resin and hardener components of an organic thermosetting composition upon a substrate without physical pre-mixing thereof; and
   adding to said components a filler material in the form of particles, wherein a major proportion of said particles have substantially the same drop rate through said resin and hardener components, without any physical mixing other than the mixing of said components by the falling of said filler material through said resin and hardener components to allow said components to react and cure thus forming a cured organic thermosetting composition having particles of said filler material dispersed therein.

2. The method of claim 1 which further comprises adjusting the density of said resin and hardener components to approximately the same range before adding said filler material.

3. The method of claim 1 wherein said organic thermosetting composition is an epoxy, polyester, or polyurethane.

4. The method of claim 1 wherein said filler material comprises finely divided particles of sand, aggregate, or mixtures thereof having a higher density than said resin and hardener components.

5. The method of claim 1 wherein a modifying agent is added to said organic thermosetting composition before the total addition of said filler material.

6. The method of claim 1 wherein a modifying agent is added to said organic thermosetting composition after placement of said composition upon said substrate.

7. The method of claim 1 wherein substantially all said particles have substantially the same drop rate, and wherein said resin has a viscosity below about 14,000 cps.

8. A method for preparing a coating of a filled two component organic thermosetting composition upon a substrate to form a composite structure which comprises:
   placing resin and hardener components of an organic thermosetting composition into holding means;
   adding to said components a filler material in the form of particles wherein a major proportion of said particles have substantially the same drop rate through said resin and hardener components, without any physical mixing other than that which occurs when said filler material falls through said resin and hardener components to form a mixture which allows said resin and hardener components to contact each other for reaction therewith;
   applying said mixture from said holding means to and upon a substrate as a coating; and
   allowing said mixture to cure upon said substrate, thus forming a composite structure of said coating of said filler material dispersed within said cured organic thermosetting composition upon said substrate.

9. The method of claim 8 which further comprises adjusting the density of said resin and hardener components to approximately the same range before adding said filler material.

10. The method of claim 8 wherein said organic thermosetting composition is an epoxy, polyester or polyurethane.

11. The method of claim 8 wherein said filler material comprises finely divided particles of sand, aggregate, or mixtures thereof having a higher density than said resin and hardener components.

12. The method of claim 8 wherein a modifying agent is added to said organic thermosetting composition before the total addition of said filler material.

13. The method of claim 8 wherein a modifying agent is added to said organic thermosetting composition after placement of said mixture upon said substrate.

14. The method of claim 8 wherein substantially all said particles have substantially the same drop rate, and wherein said resin has a viscosity below about 14,000 cps.

15. A method for preparing a structure of a filled two component organic thermosetting composition which comprises:
   placing resin and hardener components of an organic thermosetting composition into holding means;
   adding to said components a filler material in the form of particles wherein a major proportion of said particles have substantially the same drop rate through said resin and hardener components, without any physical mixing other than that which occurs when said filler material falls through said resin and hardener components to form a mixture which allows said resin and hardener components to contact each other for reaction therewith;
   allowing said resin and hardener components to react and cure in said holding means to form a structure of said cured organic thermosetting composition with said filler material dispersed therein.

16. The method of claim 15 wherein the holding means is a structural member having an aperture or void therein and wherein said cured composition fills said aperture or void.

17. The method of claim 16 wherein said structural member is of wood, cement, concrete, asphalt, or metal, and wherein said resin has a viscosity below about 14,000 cps.

18. The method of claim 15 wherein said holding means comprises mold means configured to form a predetermined shape and which further comprises removing said cured composition from said mold means in the form of said predetermined shape.

19. The method of claim 15 wherein said holding means comprises temporary mold means configured to form a predetermined shape and which further comprises removing said temporary mold means to obtain said cured composition in the form of said predetermined shape.

20. The method of claim 15 wherein said filler material comprises finely divided particles of sand, aggregate, or mixtures thereof having a higher density than said resin and hardener components.

21. A method for preparing a cured, filled, two-component organic thermosetting composition which comprises:
   placing and retaining resin and hardener components of an organic thermosetting composition upon a substrate without physical premixing thereof wherein said resin component is of a high viscosity of above about 14,000 cps; and
   adding to said resin and hardener components a filler material in the form of particles, a major proportion of which have a higher density than said resin and hardener components, without any physical mixing other than the mixing which occurs due to the falling of said higher density particles through said resin and hardener components, thus causing said components to react and cure to form a cured organic thermosetting composition upon said substrate having particles of filler material dispersed therein.

* * * * *